United States Patent [19]

Anderson

[11] 4,063,756
[45] * Dec. 20, 1977

[54] SELF-LOCKING CONNECTOR

[75] Inventor: Franklin T. Anderson, Bernardsville, N.J.

[73] Assignee: Co-Operative Industries, Inc., Chester, N.J.

[*] Notice: The portion of the term of this patent subsequent to Nov. 18, 1992, has been disclaimed.

[21] Appl. No.: 610,000

[22] Filed: Sept. 3, 1975

Related U.S. Application Data

[63] Continuation-in-part of Ser. No. 473,432, May 28, 1974, Pat. No. 3,920,269.

[30] Foreign Application Priority Data

Apr. 11, 1975 Canada .................................. 224580
Apr. 16, 1975 United Kingdom ............... 15684/75

[51] Int. Cl.² ............................................. F16L 15/00
[52] U.S. Cl. .................................... 285/84; 285/321
[58] Field of Search ....................... 285/81, 84, 85, 86, 285/91, 321, 82; 339/DIG. 2, 89 R, 89 M

[56] References Cited

U.S. PATENT DOCUMENTS

| 660,225 | 10/1900 | Smith | 285/84 |
|---|---|---|---|
| 986,818 | 3/1911 | Graham | 285/84 |
| 2,031,878 | 2/1936 | Couta | 285/84 |
| 3,207,535 | 9/1965 | Wilson | 285/86 |
| 3,343,852 | 9/1967 | Blight et al. | 339/89 M |
| 3,385,613 | 5/1968 | McCall | 285/84 |
| 3,422,390 | 1/1969 | Tucker | 285/85 X |
| 3,552,777 | 1/1971 | Heinrich et al. | 285/81 |
| 3,587,032 | 6/1971 | Normann | 285/86 |
| 3,646,495 | 2/1972 | Cowmeadow | 339/DIG. 2 |
| 3,786,396 | 1/1974 | Kemmer | 339/DIG. 2 |
| 3,808,580 | 4/1974 | Johnson | 339/DIG. 2 |
| 3,920,269 | 11/1975 | Anderson | 285/84 |

Primary Examiner—Dave W. Arola
Attorney, Agent, or Firm—Thomas N. Neiman

[57] ABSTRACT

The connector, in one embodiment thereof, rotatively receives a threaded coupling nut, and slidably receives an annular retainer. A spherical-keying arrangement prevents rotary movement between the retainer and body, and the retainer houses a pair of spring-loaded balls for forceably locking the coupling nut against rotation about the body. The coupling nut has an undulated radial surface which receives the balls to effect the rotation locking. The arrangement is so designed as to effect the locking with a substantially unvariably, resilient force, upon the coupling nut being rotatively threaded with and unthreaded from a mating coupling element.

9 Claims, 10 Drawing Figures

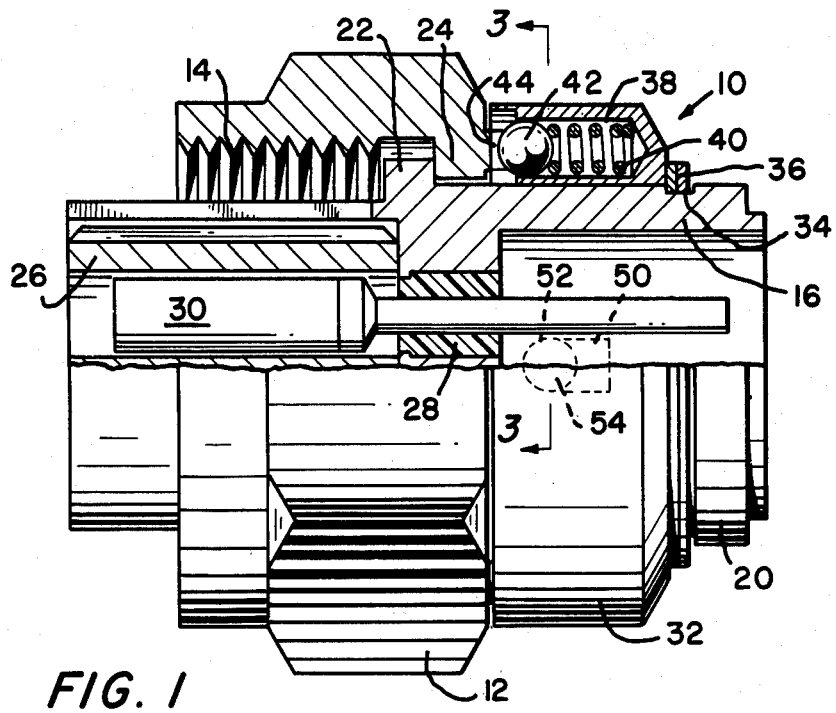
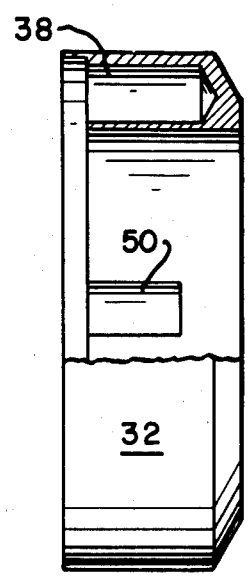
FIG. 1
FIG. 2
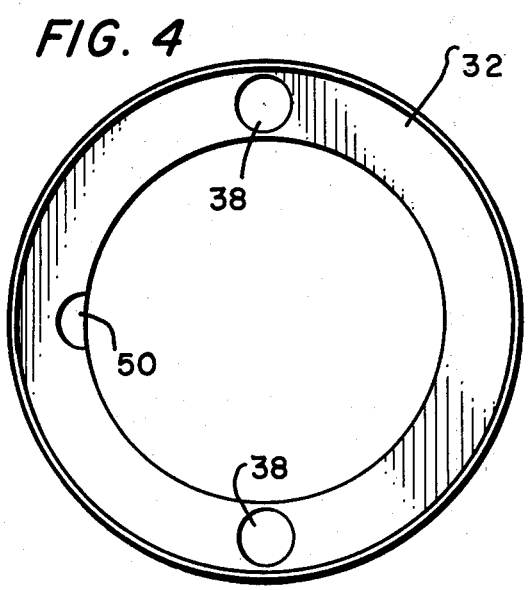
FIG. 4
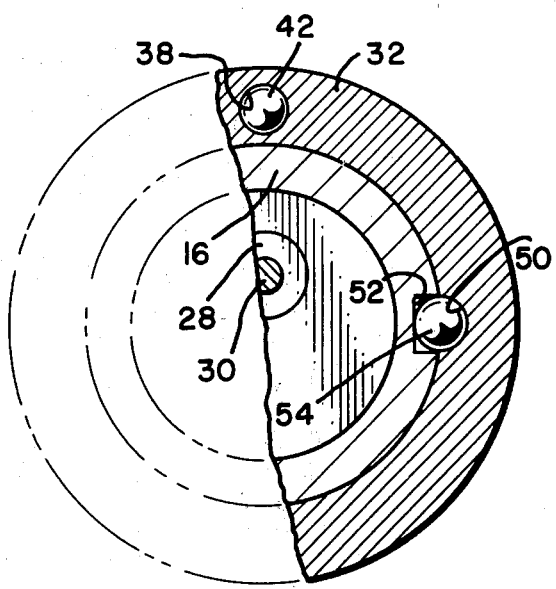
FIG. 3
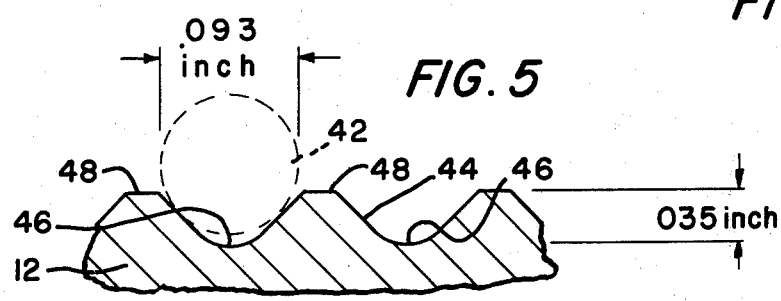
FIG. 5

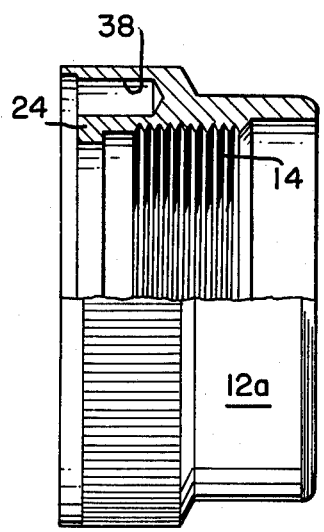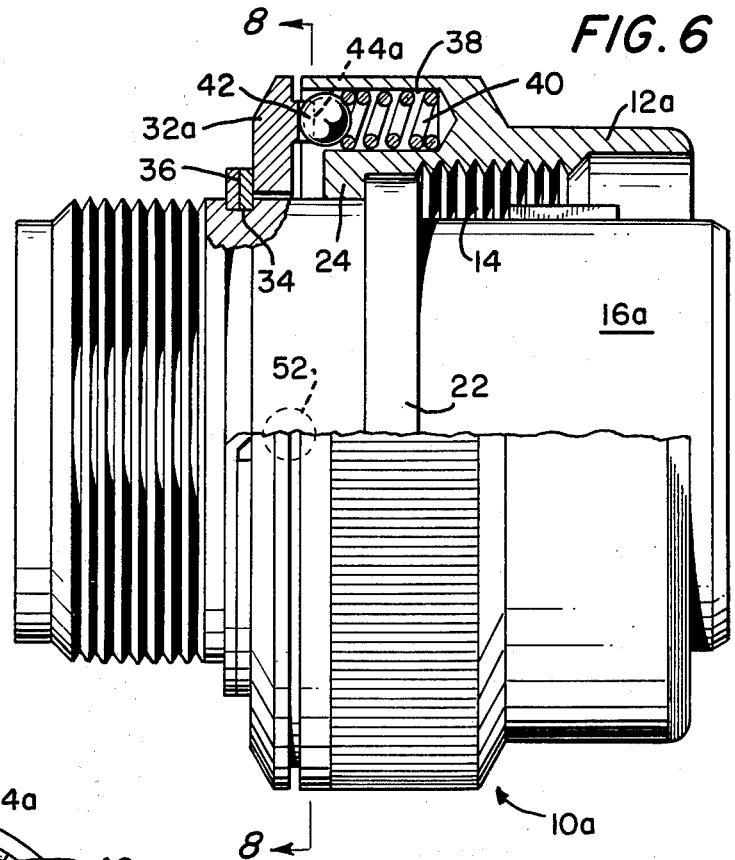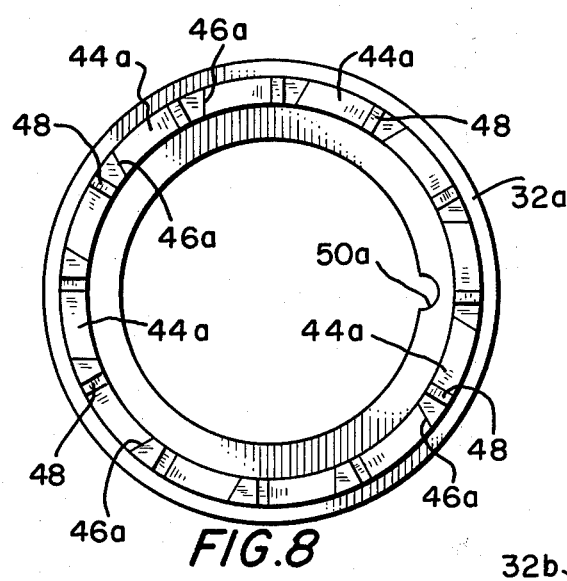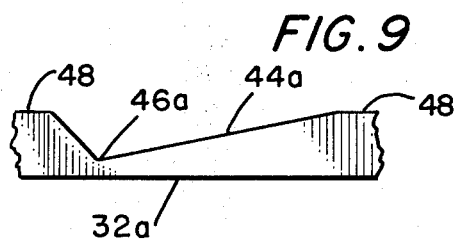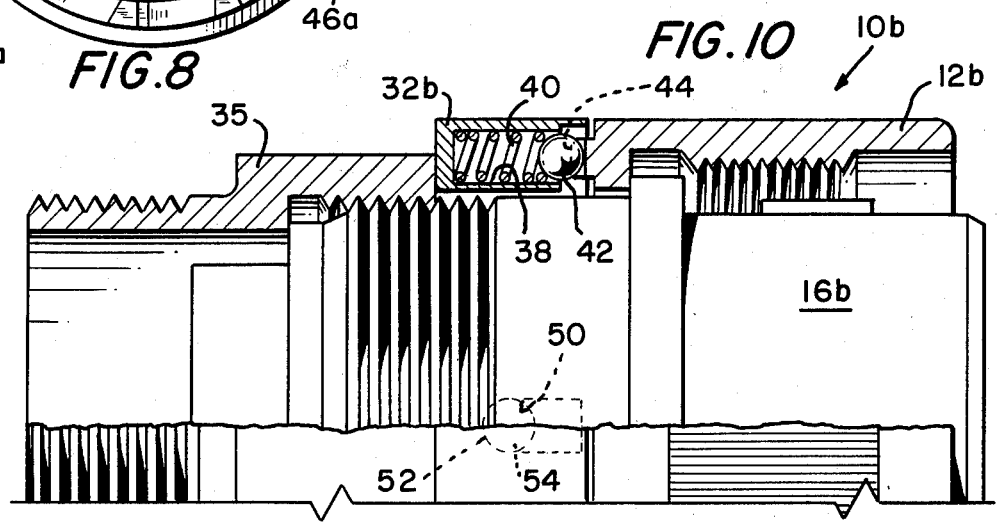

SELF-LOCKING CONNECTOR

This is a continuation-in-part of my co-pending application, Ser. No. 473,432, filed May 28, 1974, for a "Self-Locking Connector", now U.S. Pat. No. 3,920,269. The invention pertains to connectors, and in particular to self-locking connectors which are designed to prevent inadvertent uncoupling of the connector and its mating coupling element.

The prior art is replete with self-locking connectors, but in virtually every one the structures require that the connector be threadedly engaged with its mating coupling element with a progressively increased torque. This is so that the locking means, whatever they may be, will effect a varying and increasing locking force. Typical of such prior art connectors, for instance, is that comprised by U.S. Pat. No. 3,808,580, issued Apr. 30, 1974, to Lyle F. Johnson, for a "Self-Locking Coupling Nut for Electrical Connectors". In this reference, an annular wave spring is employed to effect the locking force, the force being variable and proportional to the torque applied to the connector and its mating coupling element.

Where prior art connectors employ an escalating locking force, they are subject to early mortality. Clearly, when there is any question as to whether or not a connector and its mating coupling element are sufficiently coupled, one needs only torque the two with an unquestionably great force. However, this leaves the mating threads under a severe strain all the while the two elements are thus engaged. Accordingly, the threads abrade and fracture all too soon under this type of use.

I have determined that it is something of a fallacy to design connectors for high torque coupling with a mating coupling element, especially in electrical connectors and coupling elements. Typically, there is sufficient, good and positive electrical conductivity established between the interengaging electrical components of a connector and its mating element when the threaded coupling of the latter two are only loosely threadedly engaged. Where the connector is to be of he self-locking type, it is more prudent and practical to build-in sufficient self-locking in the structure, a self-locking which needs not rely on the degree of torque arising between the coupling members, both to prevent an early mortality of the members due to unwarranted straining of the threads thereof, and to insure that the coupled members will not, inadvertently, become uncoupled.

Simply stated, what has been needed is a self-locking connector which has built into it a substantially unvariable locking force, for insuring against de-coupling of its mating member, so that the connector and its mating member may be lightly — or even loosely — threadedly engaged.

It is an object of this invention, then, to set forth an improved self-locking connector.

It is another object of this invention to teach a self-locking connector which has no need to rely upon the torque with which it is engaged with a mating, coupling element to insure its locking force and reliability.

It is a particular object of this invention to disclose an improved self-locking connector comprising a coupling member; said member having an axis, and being threaded along an axially-extending surface thereof for threaded engagement with a mating coupling element; a body member; said coupling and body members being engaged for relative rotation therebetween; said coupling and body members having first means cooperative for preventing axial movement, between said coupling and body members, in a first direction relative to said axis; and second means engaged with both said coupling and body members for preventing axial movement between said coupling and body members in a second direction relative to said axis; and wherein one of said first and second means further includes means for resiliently restraining said coupling and body members against relative rotation, with a substantially unvariable, resilient force, upon said coupling member being rotatively threaded with and unthreaded from a mating element.

Further objects of this invention, as well as the novel features thereof, will become more apparent by reference to the following description taken in conjunction with the accompanying figures, in which:

FIG. 1 is a side, elevational view, partly in cross-section, of a first embodiment of a self-locking connector, according to the invention;

FIG. 2 is a side, elevational view, partly in cross-section, of the retainer of the FIG. 1 embodiment;

FIG. 3 is a partial view of the novel connector, half thereof being shown in cross-section (taken generally along section 3—3 of FIG. 1);

FIG. 4 is a front, elevational view of the retainer viewed from the left-hand side of FIG. 2;

FIG. 5 is a fragmentary view of the undulated surface of the coupling nut, the same being a side elevational view — shown in a flat plane — greatly enlarged over the scale of FIG. 1;

FIG. 6 is a side, elevational view, partly in cross-section, of a second embodiment of a self-locking connector, according to the invention;

FIG. 7 is a side, elevational view, partly in cross-section, of the coupling nut of the FIG. 6 embodiment;

FIG. 8 is a partial view of the annular retainer, taken generally along section 8—8 of FIG. 6;

FIG. 9 is a fragmentary view of the undulated surface of the annular retainer; and FIG. 10 is a side, elevational view, partly in cross-section, of a third embodiment of a self-locking connector in accord with the invention.

As shown in FIG. 1, the improved self-locking connector 10, here depicted by way of example as an electrical connector, comprises a coupling nut 12 having an axially-threaded surface 14 for threadedly and coupling engaging a mating coupling element. The nut 12 is rotatably engaged with a body 16, the nut having an aperture 18 for coaxially engaging an outer diameter 20 of the body. The body 16 and nut 12 have radial flanges 22 and 24, respectively, which abut to prevent the nut from sliding free of the body at one axial end thereof. The body carries an insert 26 and beads 28 with electrical inserts 30 (only one of each being shown) according to practices well known in the art. Thus, furdiscussion of these components, which have little bearing on the novelty of the connector 10, is considered to be unnecessary.

A retainer 32 defined as an annulus is slidably and coaxially received about diameter 30 of the body 16. The body 16 has an annular groove 34 formed therein which receives a resilient retaining ring 36; thus, ring 36 secures retainer 32 in position on body 16, and the latter, in turn, secures the nut 12 in place.

Retainer 32 has a pair of bores 38, as better shown in FIGS. 2, 3 and 4, formed axially therein which receive helical compression springs 40 (only one being shown).

Each spring bears at one end in the closed bottom of a bore 38 and, at the other end bears against a ball 42. Each spring and ball cooperate with an undulated surface 44, formed on the nut 12 to operate as locking detents. The side, elevational and fragmentary view of the surface 44 of nut 12, in FIG. 5, shows the cooperation of the ball(s) 42 with the recesses 46 and interveing peaks or prominences 48. In this embodiment, the balls have a diameter of 0.093-inch, and the recesses 46 have a depth of 0.035-inch. In alternative embodiments, other relative dimensions may be found practical, however it is a teaching of this invention to have the depth of the recesses less than half the diameter of the balls — this to facilitate a displacement of the balls from one recess 46 to another adjacent thereto. When half or more of the detent balls 42 are nested in the recesses 46, it requires undue force to displace them. It is clear that the detenting effect arises more from the resilient force with which the balls are restrained in the recesses than from the depth to which the balls are nested.

The body 16 and retainer 32 are secured against relative rotation therebetween by means of a ball-key arrangement which is best seen in FIGS. 2, 3 and 4. The retainer 32 has an axially-extending groove 50 formed in an inner wall surface thereof, the groove having a hemispheric cross-section. Body 16 has a radial bore 52 formed therein. Now then, when coupled together, with retainer 32 slidably engaged with diameter 20 of the body, the groove 50 and bore 52 interface and enclose therebetween a keying ball 54 (shown in phantom outline in FIG. 1). Thus, the body 16 and retainer 32 are locked together, preventing rotation of one relative to the other.

Simply by withdrawing the retaining ring 36 from the annular groove 34, the retainer 32 — with the detent springs 40 and balls 42, and the nut 12 can all be slid off of the body 16 from the free end thereof opposite the flange 22.

This novel connector 10 has a full, efficient, and substantially unvariable locking force built into it. It is of no consequence how greatly nut 12 is torqued into threaded engagement with a mating coupling element, the nut 12 is restrained against rotation relative to body 16 with a substantially constant force. In this particular embodiment, the balls 42 are urged against the undulated surface 44 of the nut with a force of between one and a half to four inch-pounds, approximately — and this force (wear, and spring fatigue aside) neither increases nor diminishes. This built-in efficient locking force will prevent inadvertent uncoupling of the connector 10 from a mating coupling element, even if the two are but loosely, threadedly engaged, and requires no undue tensioning of the interengaging threads to preserve the coupling.

FIGS. 6–9 depict an alternative embodiment 10a of the connector. In the ensuing discussion of embodiment 10a, same or like index numbers shall be understood to signify same or like components — as compared to such in the FIGS. 1–5 embodiment. Connector 10a comprises a coupling nut 12a with an axially-extending threaded surface 14. The nut 12a is rotatably engaged with a body 16a. The body 16a and the nut 12a have radial flanges 22 and 24, respectively, which define a slidable and rotational interface therebetween — to prevent axial movement of the nut 12a, relative to the body 16a, to the right (as viewed in FIG. 6).

A retainer 32a defined as a disk-type annulus is slidably and coaxially received on the body 16a. The body has an annular groove 34 formed therein which receives a resilient retaining ring 36; thus, ring 36 secures retainer 32a in position on body 16a, and the latter, in turn, blocks movement of the nut 12a axially relative to the body 16a, to the left (as viewed in FIG. 6).

In this embodiment 10a, the nut 12a has a pair of bores 38 formed axially therein which receive helical compression springs 40 (only one being shown). Each spring constrains a ball 42 against an undulated surface 44a which is formed on the adjacent surface of retainer 32a.

The body 16a and retainer 32a are also secured against relative rotation, similarly as in the FIGS. 1–5 embodiment 10, by means of a ball-key arrangement. In this structure, the retainer 32a has a hemispheric channel 50a formed therein which interfaces with a bore 52 formed in the body 16a.

The undulated surface 44a of the retainer 32a, shown in fragment in FIG. 9, has a series of peaks or promin ces 48 which set apart intervening recesses 46a. Here, the recesses are defined by a first plane, set at a steep angle, and a second plane set at a shallow angle. The angular disparity renders a rotation of the nut 12a relatively easy in one rotary direction, and more difficult in the contrary direction. In this way, threaded coupling of the nut 12a to a mating coupling member can be effected with little force, but an un-coupling of the nut 12a from its mating member will require greater force.

A further alternative embodiment 10b of the novel connector is shown in FIG. 10 where, again, like or same index numbers denote like or same components as those comprised by the embodiments 10 and 10a. Connector 10b has a coupling nut 12b and a body 16b, the same also being rotatively engaged by means of flanges 24 and 22, respectively. In this version, however, a retainer 32b carries the detent means — springs 40 and balls 42 in detent bores 38 axially formed in the retainer 32b. So also, the undulated surface 44 — again, as in the FIGS. 1–5 embodiment 10 — is borne by the coupling nut 12b. In lieu of a resilient retaining ring, however, the retainer 32b is secured in place on the body 16b by means of a sleeve 35 which is internally and externally threaded. The internal threads engage external threads formed on the body 16b. Thus, the sleeve 35 both positions and retains the retainer 35. A hemispheric channel 50 is formed in the retainer 32b, in the inner surface thereof, to interface with a bore 52 formed in the body 16b, again to receive therein a keying ball 54.

While I have described my invention in connection with specific embodiments thereof, it is to be clearly understood that this is done only by way of example, and not as a limitation to the scope of my invention as set forth in the objects thereof and in the appended claims.

I claim:

1. A self-locking connector, comprising:
 a coupling member;
 said member having an axis, and being threaded along an axially-extending surface thereof for threaded engagement with a mating coupling element;
 a body member;
 said coupling and body members being engaged for relative rotation therebetween;
 said coupling and body members having first means cooperative for preventing axial movement, between said coupling and body members, in a first direction relative to said axis; and second means engaged with both said coupling and body members for preventing axial movement between said coupling and body members in a second direction relative to said axis; and wherein said second means further includes means operative for resiliently restraining said coupling and body members against relative rotation, with a substantially unvariable, resilient force, upon said coupling member being rotatively threaded with and unthreaded from a mating coupling element.

2. A self-locking connector, according to claim 1, wherein:

said first means comprises flanges formed on said coupling and body members which define a rotatable and slidable interface therebetween.

3. A self-locking connector, according to claim 1, wherein:

said second means comprises annulus means, carried by one of said members which blocks axial movement, in said second direction, of the other of said members relative to said one member.

4. A self-locking connector, according to claim 1, wherein:

said second means is replaceably engaged with said coupling and body members.

5. A self-locking connector, comprising:

a coupling member;

said member having an axis, and being threaded along an axially-extending surface thereof for threaded engagement with a mating coupling element;

a body member;

said coupling and body members being engaged for relative rotation therebetween;

said coupling and body members having first means cooperative for preventing axial movement, between said coupling and body members, in a first direction relative to said axis, and second means engaged with both said coupling and body members for preventing axial movement between said coupling and body members in a second direction relative to said axis; and wherein one of said first and second means further includes means for resiliently restraining said coupling and body members against relative rotation, with a substantially unvariable, resilient force, upon said coupling member being rotatively threaded with and unthreaded from a mating coupling element;

said second means comprises an annular element; and said restraining means comprises detent means interposed between said annular element and said coupling member.

6. A self-locking connector, according to claim 5, wherein:

said annular element has an undulated surface formed thereon;

said coupling member has a plurality of bores axially formed therein; and said detent means is nested in said bores for lockingly engaging said undulated surface of said annular element.

7. A self-locking connector, according to claim 5, wherein:

said annular element has a plurality of bores axially formed therein;

said coupling member has an undulated surface formed thereon; and said detent means is nested in said bores for lockingly engaging said undulated surface of said coupling member.

8. A self-locking connector, according to claim 5, further including:

means interposed between said annulus means and said one member preventing relative rotation between said annulus means and said one member.

9. A self-locking connector, according to claim 5, wherein:

said undulated surface is defined as a series of recesses, each of which is separated from another thereof by intervening prominences; and each of said recesses has a first wall lying in a first plane at a first angle, and a second wall lying in a second plane at a diverse angle.

* * * * *